United States Patent Office 3,296,165
Patented Jan. 3, 1967

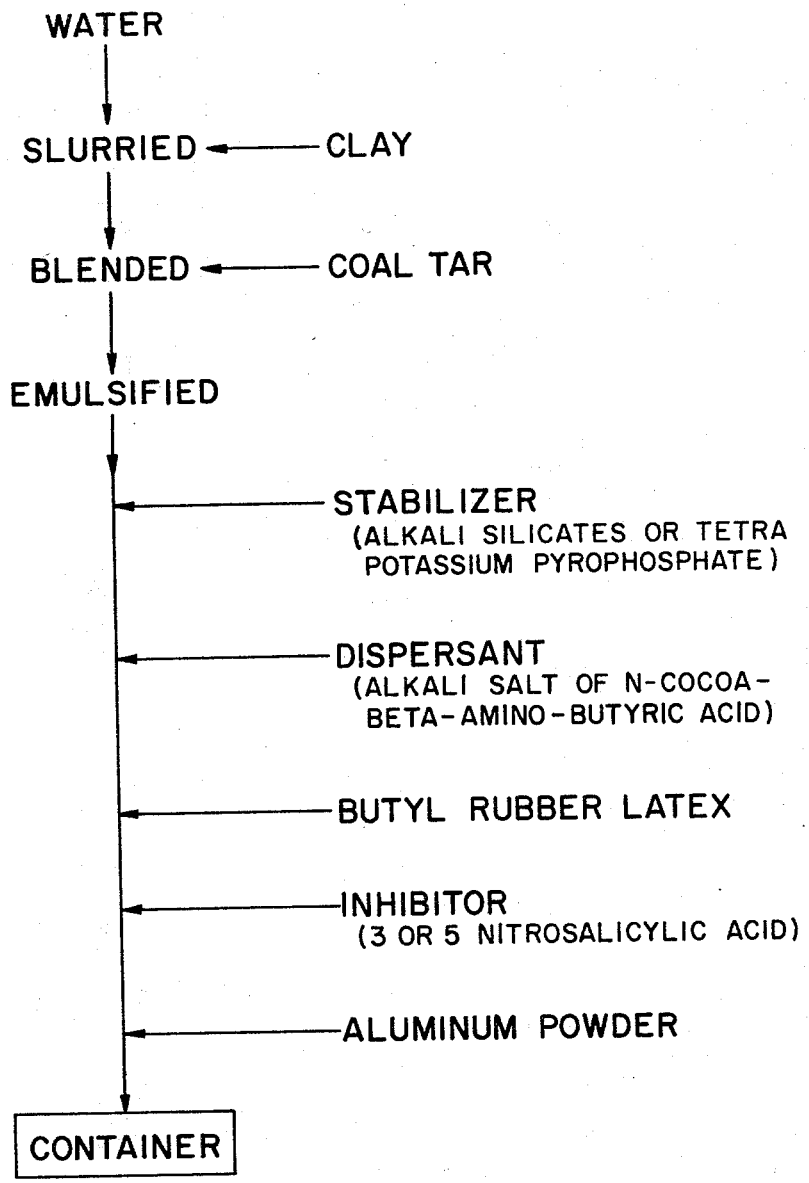

3,296,165
BITUMINOUS EMULSION COATING
Woodrow E. Kemp, Pittsburgh, Pa., assignor to Koppers Company, Inc., a corporation of Delaware
Filed Mar. 19, 1963, Ser. No. 266,335
3 Claims. (Cl. 260—28.5)

This invention relates generally to bituminous coatings.

Bituminous coatings are widely used for protection of steel, concrete and wood. They are relatively low in cost, and they have excellent resistance to water, chemical inertness, adhesion, and high electrical resistivity. These coatings are generally black or brown in color.

It is desirable for many purposes to add an aluminum pigment to the bituminous coating. The resulting composition yields a film having a bright metallic appearance due to the leafing characteristics of flake aluminum. It has been found, for example, that bituminous roofing coatings, which include aluminum pigments, tend to lower the temperature of the building due to the heat reflecting property of the aluminum. The addition of aluminum also tends to reduce the cold flow and alligatoring of the film. Alligatoring denotes the cyclic condition that results from the surface hardening either from oxidation (ultraviolet light seems to catalyze the action) or from evaporation of plasticizing oils and subsequently cracking from cold flow movement of the subsurface that keeps repeating until the cracks become quite wide and the surface finally resembles the skin of an alligator.

Bituminous coatings are advantageously handled as aqueous emulsions for the reason that health and safety hazards may be involved when volatile and combustible organic solvents are used. Aqueous emulsion coating of bituminous material and aluminum has the problem that aluminum powder in contact with moisture reacts chemically to generate hydrogen gas. Mr. Charles N. Beck, Chairman of Technical Committee of Pittsburgh Paint and Varnish Production Club, *Official Digest*, November 1952, p. 730, reported that a 1,000 gallon batch of aluminum paint, which showed no pressure when uncontaminated with moisture, showed a pressure build-up of 23 pounds per square inch over a five-week period when contaminated with 0.5% water. Even if the composition be mixed and used immediately thereafter, the dried film or coating has heretofore been extremely porous in nature due to hydrogen evolution and has not exhibited protective properties. While inhibitors for the chemical action are known, the inhibitors tend to break the emulsion; and when the emulsion breaks, it is useless as a coating.

There has been found, in accordance with this invention, a novel storage stable coating composition containing aluminum pigments in an aqueous coal tar emulsion vehicle that has excellent properties as a coating. The novel composition, after long periods of time in a closed container, evidences neither change in gas content nor change in viscosity upon storage.

An additional feature of the unique coating of this invention is that the aluminum pigmentation is carried throughout the entire dried coating film and is not merely leafed on the surface. The composition dries to a film that has a bright aluminum finish and that bonds to bituminous, wood, concrete, and metal surfaces. The coating, of course, presents no fire hazard because it contains no organic solvents. The dried film is water and chemical resistant. The film, for example, will withstand extreme heat and continuous temperatures from —50° F. to +200° F. and will withstand flash temperature heat to 500° F. The dried film will not support combustion by itself; it will not burn unless exposed to a flame from another source; and it goes out, thus extinguishing itself, when the flame is removed.

The novel composition of this invention has the additional advantageous property of heavy body to provide a thick coating. It is broadly a recognized fact that everything else being equal, the life and durability of protective coatings increases with thickness. In other words, extra thickness which the novel coating composition can provide means longer life and lower cost of maintenance. Even so the novel film obtained from the composition of this invention has a lasting ductility or lifeness. Thus, the film has the necessary flexibility to expand and contract itself with heat and cold and to withstand wetting and drying or alligatoring.

There is provided, in accordance with this invention, an aqueous emulsion that includes aluminum pigment and coal tar. The emulsion is comprised of water to the extent of between 20 and 60% by weight and by difference of solids to the extent of between 60 and 40%. The solids include aluminum powder, coal tar, stabilizer, dispersant, inhibitor, and butyl rubber. In the preparation of the composition, an aqueous emulsion is made with coal tar. The emulsion is fortified by the use of a stabilizer and a butyl latex is added thereto. This is followed by the addition of an inhibitor for aluminum powder. Thereafter, the aluminum powder is admixed with the aqueous vehicle.

A process for making the novel coating composition of this invention is illustrated by the flow diagram in the drawing.

The aluminum powder preferred for use in the invention is the aluminum metal powder product wherein the particles are essentially in flake form, as is conventional for aluminum coatings. It will be appreciated, however, that the invention is applicable to the various mesh sizes of aluminum, such as the coarse mesh size used for paints and the fine mesh size used for inks. The common form of aluminum powder is made to have a leafing property. However, both the leafing and the non-leafing types of powder may be used in this invention.

The aqueous vehicle to which the aluminum is added may be prepared in a conventional manner. Advantageously, coal tar as a liquid and an aqueous slurry of slip agents is passed through a colloid mill or other emulsifying mill.

Coal tar is a smooth, homogeneous, viscous liquid which results from the destructive distillation of coal. The coal tars which have been found usable in the present invention are identified as RT–2 to RT–12 by Federal specifications. RT–2, for example, has an Engler viscosity at 40° C. of 8–13 seconds and the much heavier tar RT–12 has a viscosity range expressed as float test seconds at 50° C. of 150–220. The intermediate grades of tar, of course, have intermediate viscosities between these limits.

The aqueous slurry for emulsifying the coal tar is comprised of water and finely divided mineral fillers which are finely divided materials that are capable of being dispersed in water and have the property of increasing substantially the viscosity of the bituminous emulsion mixture. Suitable materials are clay, diatomaceous earth, talc, and argillaceous materials. Bentonite clay in admixture with other forms of clay and talc are preferred. The content of the finely divided mineral filler in the slurry may vary within the range of from 15 to 25% by weight but advantageously is about 20% by weight of the slurry. A mixture of clay, talc and bentonite is advantageously used with the bentonite constituting from 5 to 50% of the mixture.

The emulsification of the tar and the aqueous slurry may be carried out in a conventional manner. Advantageously, the tar can be heated above its melting point to a liquid state, for example, to a temperature of between 270° F. and 215° F. The aqueous slurry which may be at a temperature between ambient temperature and 135° F. and the tar are fed at the desired ratio to a blender or mixer. The tar should constitute from 20 to 40% of the total weight of the emulsion. The blender subjects the mixture to a slight shearing action. The resulting product, a thick, doughy mass, is fed through a colloid mill or other suitable emulsifying mill which subjects the material to intense shearing as it passes between small clearances. The resulting emulsion leaves the mill at a temperature of between about 140 and 180° F. as a smooth, creamy, dark-brown product of uniform appearance and of fairly thick consistency. The emulsion may vary widely within the following ranges (percent by weight with the maximum, minimum, and preferred values being based on the amount of tar present):

|  | Minimum (Percent) | Maximum (Percent) | Preferred (Percent) |
| --- | --- | --- | --- |
| Tar | 20 | 45 | 40 |
| Water | 64 | 45 | 47 |
| Clay | 15 | 5 | 10 |
| Bentonite | 1 | 5 | 3 |

The emulsion is still in a formative stage and after it leaves the colloid mill, it thins upon cooling. Upon further standing, the emulsion will assume the nature of a gel, that is, it is thixotropic; but it breaks down quickly upon mixing.

In accordance with this invention, the emulsion is fed to a conventional mixer and further stabilized by the addition thereto of a stabilizer that is a member selected from the class consisting of an alkali silicate having a high alkali oxide-silicon dioxide ratio or tetra-potassium pyrophosphate. The alkali metal silicates are advantageously those which have an alkali metal oxide-silica dioxide ratio of at least 1:3. These materials are available, for example, under the trademark "S 35" (Philadelphia Quartz Company). The stabilizer is used to the extent of at least 0.1% by weight of the composition, but no advantage is seen in using more than 1% by weight. It is preferred to use about 0.25% by weight.

There is also added at this time as a dispersant for the aluminum powder the alkali metal salt of N-cocoa-beta-amino-butyric acid. Such amines are commercially available, for example, under the trademark "Armeen SZ." These amines offer a degree of protection of the emulsion against mechanical degradation when the aluminum powder is mixed with the emulsion.

While the emulsion is being mixed, there is also added a latex of butyl rubber. Butyl rubber is the product of the copolymerization of isobutylene with a small amount (1 to 2 mol percent) of a diene, such as, isoprene and butadiene, to leave only a small residual unsaturation of the polymer. Butyl rubber latex is commercially available, for example, Butyl Latex 80-21, by Enjay Company, Inc. The latex usually has 40 to 60% solids. A typical latex, for example, has a white color, a total solids content of 54 to 55% by weight, a density in pounds per gallon of 8.1, an average particle size of 0.5 micron, and an unsaturation content of 1.5 to 2 mol percent. The latex may be creamed to give a rubber-rich layer and thereby an increased concentration of the latex solids. The final composition of this invention should contain at least 1% of butyl rubber solids and may contain more than 10% butyl rubber solids, although a greater solids content than this seems not to add further desirable properties to the composition. Advantageously, the latex is added so as to give a final concentration of about 2½% of butyl rubber solids.

It is surprising that butyl rubber latex could be mixed with coal tar emulsion to give a stable product and one that, when mixed with aluminum powder, will form an elastic dry film. Butyl rubber itself is incompatible with tar; that is, it is not possible to dissolve butyl rubber in tar.

The inhibitor comprised of the 3- or 5-nitro salicylic acid isomers or a mixture thereof. These isomers are yellowish crystals. The compounds may readily be formed by the nitration of salicylic acid with sulyfuric and nitric acids. This inhibitor is used to the extent of from 0.1 to 1% by weight of the total composition.

The aluminum powder is added to the foregoing aqueous emulsion vehicle, advantageously to the extent that it constitutes about 14% by weight of the total composition. The amount of aluminum powder is not particularly critical although it is preferred not to add more than 25% by weight of aluminum powder as there is then insufficient binder to provide the good coating properties. Of course, if too little aluminum powder be added, for example, 1% by weight, there is not sufficient aluminum powder to provide the desirable characteristics required for the invention.

As an example of the invention, an aqueous slurry is made by mixing together 43 parts of water with 9 parts of talc and 3 parts of bentonite. This is blended with 31 parts of coal tar pitch (RT-12), and the admixture is then passed through a colloid mill. The emulsion from the colloid mill is a black liquid. To a mixture equipped with an agitator is added 63.5 parts of the foregoing coal tar emulsion; then 16.2 parts of water is added, 0.5 part of high mole ratio sodium or potassium silicate, 0.65 part of N-cocoa-beta-amino-butyric acid ("Armeen-SZ"), 5.5 parts of butyl latex ("Enjay Latex 80–21"), and 0.25 part of 3 or 5 nitro-salicyclic acid. After the ingredients have been thoroughly mixed, there is then added 13.4 parts of commercial aluminum powder. The addition of 1–2% of pine oil at this point may be employed to assist "flow-out" on spray application if desired. The resulting product has a thick paint consistency and can be stored in a closed container for an indefinite period of time without decomposition.

The exact ratio of the components is not particularly critical, but sufficient nitro-salicylic acid must be present to inhibit the chemical action of aluminum in water and sufficient dispersants must be present to obtain good dispersion of the aluminum powder and control of the viscosity of the emulsion.

The ratio of the solids components are not particularly critical and the components can vary within a wide range. The following tabulation shows minimum and maximum values as weight percent of the total composition for each component:

|  | Minimum (percent) | Maximum (percent) |
| --- | --- | --- |
| Coal tar | 15 | 40 |
| Butyl rubber solids | 1 | 5 |
| Inhibitor | 0.1 | 1 |
| Stabilizer | 0.1 | 1 |
| Dispersant | 0.2 | 2 |
| Aluminum powder | 8 | 25 |
| Water | 40 | 60 |

It is, of course, evident that the characteristics of the coating and the resulting film can be varied widely. Adjustments can be initially made in the coal tar emulsion so as to vary its viscosity widely but by varying the ratio of water, coal tar, and slip agent. This may be further controlled by the amount of stabilizer and dispersant added, by the quantity of butyl latex added, and by the quantity of aluminum powder and particle size of the aluminum powder. Thus, the composition lends itself readily to control to provide the most suitable viscosity and pigment characteristic for the desired application.

The coating should have a viscosity so that a film, when applied to a vertical surface, does not sag. As described above, the consistency is readily adjusted to the mode of application which may be, for example, by brushing, spraying with a doctor knife and the like. The extent of coverage of the surface by a coating will vary widely, of course, depending upon the conditions. For example, it may vary from 50 square feet of coverage per gallon to about 500 square feet per gallon. The dried film will usually be within the limits of a minimum of 2 mils to a maximum of about 15 mils.

I claim:

1. A storage stable aqueous aluminum-filled bituminous emulsion comprised of the following components within the ranges of the weight percent tabulated:

|  | Minimum (percent) | Maximum (percent) |
|---|---|---|
| (a) Coal tar | 15 | 40 |
| (b) Butyl rubber latex soilds, said butyl rubber being the product of the copolymerization of isobutylene with a small amount of a diene selected from the class consisting of isoprene and butadiene | 1 | 5 |
| (c) Inhibitor selected from the class consisting of the 3- and the 5-nitro salicylic acid isomers and mixtures thereof | 0.1 | 1 |
| (d) Stabilizer selected from the class consisting of alkali silicates having an alkali oxide-silicon dioxide ratio of at least 1:3 and tetrapotassium pyrophosphate | 0.1 | 1 |
| (e) Alkali metal salt of N-cocoa-beta-amino-butyric acid | 0.2 | 2 |
| (f) Aluminum powder | 8 | 25 |
| (g) Water | 40 | 60 |

2. The composition of claim 1 including 1 to 2% by weight of pine oil.

3. A storage stable aqueous aluminum-filled bituminous emulsion prepared by emulsifying between 20 and 45 parts by weight of tar, between 5 and 15 parts of clay and 1 to 5 parts of bentonite in between 64 and 45 parts of water, thereafter adding to the emulsion between 0.1 and 1 part of a member selected from the class consisting of alkali metal silicates having an alkali metal oxide-silicon dioxide ratio of at least 1:3 and tetrapotassium pyrophosphate, between 0.2 and 2 parts of N-cocoa-beta-amino-butyric acid, between 0.1 and 1 part of a member selected from the class consisting of 3-nitro salicylic acid, 5-nitro salicylic acid and mixtures thereof, between 1 and 5 parts of butyl rubber solids as latex, said butyl rubber being the product of the copolymerization of isobutylene with a small amount of a diene selected from the class consisting of isoprene and butadiene, and between 8 and 25 parts of aluminum powder to provide a composition comprised of the following components within the tabulated weight percent ranges:

|  | Minimum (percent) | Maximum (percent) |
|---|---|---|
| (a) Coal tar | 15 | 40 |
| (b) Butyl rubber latex solids | 1 | 5 |
| (c) Inhibitor selected from the class consisting of the 3- and the 5-nitro salicylic acid isomers and mixtures thereof | 0.1 | 1 |
| (d) Stabilizer selected from the class consisting of alkali silicates having an alkali oxide-silicon dioxide ratio of at least 1:3 and tetrapotassium pyrophosphate | 0.1 | 1 |
| (e) Alkali metal salt of N-cocoa-beta-amino-butyric acid | 0.2 | 2 |
| (f) Aluminum powder | 8 | 25 |
| (g) Water | 40 | 60 |

References Cited by the Examiner

UNITED STATES PATENTS

| | | | |
|---|---|---|---|
| 2,477,236 | 7/1949 | Buchanan | 106—282 |
| 2,506,339 | 5/1950 | Buckley et al. | 260—28.5 |
| 2,709,689 | 5/1955 | Herzog et al. | 260—8 |
| 2,838,414 | 6/1958 | Dunphy et al. | 106—282 |
| 2,904,523 | 9/1959 | Hawkins et al. | 260—8 |
| 2,941,893 | 6/1960 | McConnaughay | 106—170 |
| 3,128,261 | 4/1964 | Lane et al. | 260—28.5 |

MORRIS LIEBMAN, *Primary Examiner.*

J. A. GAZEWOOD, *Assistant Examiner.*